(12) United States Patent
Chen et al.

(10) Patent No.: US 10,236,514 B2
(45) Date of Patent: Mar. 19, 2019

(54) LITHIUM ION FLOW BATTERY

(71) Applicant: Beijing Hawaga Power Storage Technology Company Ltd., Beijing (CN)

(72) Inventors: Yongchong Chen, Beijing (CN); Caimei Feng, Beijing (CN); Yanping Zhang, Beijing (CN); Ping Zhang, Beijing (CN); Qiuping Wang, Beijing (CN)

(73) Assignee: Beijing Hawaga Power Storage Technology Company Ltd., Beijing (CN)

( * ) Notice: Subject to any disclaimer, the term of this patent is extended or adjusted under 35 U.S.C. 154(b) by 177 days.

(21) Appl. No.: 15/110,044

(22) PCT Filed: Jan. 20, 2015

(86) PCT No.: PCT/CN2015/071125
§ 371 (c)(1),
(2) Date: Jul. 6, 2016

(87) PCT Pub. No.: WO2015/109994
PCT Pub. Date: Jul. 30, 2015

(65) Prior Publication Data
US 2016/0329569 A1 Nov. 10, 2016

(30) Foreign Application Priority Data
Jan. 21, 2014 (CN) .......................... 2014 1 0027599

(51) Int. Cl.
*H01M 8/0232* (2016.01)
*H01M 8/0234* (2016.01)
(Continued)

(52) U.S. Cl.
CPC ....... *H01M 4/8626* (2013.01); *H01M 2/1673* (2013.01); *H01M 8/0232* (2013.01);
(Continued)

(58) Field of Classification Search
CPC ........ H01M 4/86; H01M 4/8626; H01M 8/20; H01M 2/16; H01M 2/1673; H01M 8/18; H01M 8/188
See application file for complete search history.

(56) References Cited

U.S. PATENT DOCUMENTS

2011/0114496 A1* 5/2011 Dopp ................ H01M 4/8631
205/109

FOREIGN PATENT DOCUMENTS

| CN | 101593841 A | 12/2009 | |
|---|---|---|---|
| CN | 103187551 A * | 7/2013 | ............. H01M 2/16 |
| CN | 103187551 A * | 7/2013 | ............. H01M 2/16 |

* cited by examiner

*Primary Examiner* — Karie O'Neill Apicella
(74) *Attorney, Agent, or Firm* — Rudy J. Ng; Bret E. Field; Bozicevic, Field & Francis LLP

(57) ABSTRACT

A lithium ion flow battery comprising cathode current collectors (21), an anode current collector (22), a cathode reaction chamber (24), an anode reaction chamber (25), a separator (23), a cathode suspension solution (26) and an anode suspension solution (27), wherein the cathode and anode current collectors are located at both sides of the separator respectively and are in close contact with the separator to form sandwich composite structure layers of the cathode current collector, the separator and the anode current collector; and in that several sandwich composite structure layers are arranged in sequence in an order that current collectors with the same polarity are oppositely arranged, and the electrode suspension solution continuously or intermittently flows in a battery reaction chamber between adjacent sandwich composite structure layers. Thus, the size of
(Continued)

the battery reaction chamber can be flexibly designed according to the viscosity of the electrode suspension solution without increasing the polarization internal resistance of the battery, thereby solving the restriction conflict existing in the existing lithium ion flow battery between the size of the battery reaction chamber and the polarization internal resistance of the battery.

10 Claims, 3 Drawing Sheets

(51) Int. Cl.
    *H01M 8/0243*     (2016.01)
    *H01M 8/0293*     (2016.01)
    *H01M 4/86*         (2006.01)
    *H01M 2/16*         (2006.01)
    *H01M 8/18*         (2006.01)
    *H01M 8/20*         (2006.01)
    *H01M 8/0239*     (2016.01)

(52) U.S. Cl.
    CPC ....... *H01M 8/0234* (2013.01); *H01M 8/0239* (2013.01); *H01M 8/0243* (2013.01); *H01M 8/188* (2013.01); *H01M 8/20* (2013.01); *H01M 8/0293* (2013.01); *Y02E 60/528* (2013.01)

LITHIUM ION FLOW BATTERY

FIELD OF THE INVENTION

The present invention pertains to a technical field of chemical energy storage battery, and particularly relates to lithium ion flow battery.

BACKGROUND OF THE INVENTION

Lithium ion flow battery is a newly developed chemical battery technology, which integrates the advantages of lithium ion battery and flow battery, and thus becomes a novel rechargeable battery with independent power output and energy storage capacity, high energy density and low cost. Lithium ion flow battery has tremendously wide market prospects in wind power generation, photovoltaic power generation, power grid peak load regulation, power station distribution, municipal transportation and the like.

Lithium ion flow battery is composed of a cathode suspension solution tank, an anode suspension solution tank, a battery reactor, a liquid pump or pneumatic control system, and sealed conduits, wherein the cathode suspension solution tank contains a mixture of cathode materials particles, a conductive additive and an electrolyte, and the anode suspension solution tank contains a mixture of anode materials particles, a conductive additive and an electrolyte. The structure of a lithium ion flow battery reactor comprises: a cathode current collector, a cathode reaction chamber, a cathode liquid inlet, a cathode liquid outlet, a separator, an anode current collector, an anode reaction chamber, an anode liquid inlet and an anode liquid outlet. The cathode suspension solution flows into the cathode reaction chamber of the battery reactor via the cathode liquid inlet, flows out via the cathode liquid outlet after the reaction is completed, and returns to the cathode suspension solution tank through sealed conduits under the action of the liquid pump propulsion or pneumatic control system; and meanwhile, the anode suspension solution flows into the anode reaction chamber of the battery reactor via the anode liquid inlet, flows out via the anode liquid outlet after the reaction is completed, and returns to the anode suspension solution tank through the sealed pipelines under the action of the liquid pump propulsion or pneumatic control system.

The battery reaction chamber is an important component of a lithium ion flow battery reactor, wherein an electrode suspension solution flows intermittently or continuously within the battery reaction chamber to complete the charge-discharge reaction of the battery, and an electron-nonconductive separator is provided between the cathode reaction chamber and the anode reaction chamber of the lithium ion flow battery reactor, such that conductive particles in the cathode suspension solution (particles of cathode active materials and particles of conductive additives) and those in the anode suspension solution (particles of anode active materials and particles of conductive additives) are separated from each other to avoid short circuit occurred within the battery caused by direct contact of the conductive particles.

Compared with the electrolyte of an all-vanadium redox flow battery, the electrode suspension solution of the lithium ion flow battery is more viscous and relatively more difficult to flow, thus there is a high requirement on design for the reaction chamber of the battery reactor, in which case an excessively narrow reaction chamber could be detrimental to the flow of the electrode suspension solution. Previously, the structure of a lithium ion flow battery reactor is generally designed such that: several separators are arranged in parallel equidistantly, the space therebetween alternately constituting the cathode reaction chambers and the anode reaction chambers, wherein a cathode current collector is located in the middle of the cathode reaction chamber, and cathode suspension solution continuously or intermittently flows within the gap between the cathode current collector and the separator; an anode current collector is located in the middle of the anode reaction chamber, and anode suspension solution continuously or intermittently flows within the gap between the anode current collector and the separator, as shown in FIG. 1. In other words, the gaps between the current collectors and the separators form an electrochemical reaction chamber of the battery. When the battery is working, the cathode suspension solution (16) continuously or intermittently flows within the gap space between the cathode current collector (11) within the cathode reaction chamber (14) and the separator (13), and electrons transfer between the cathode suspension solution (16) and the cathode current collector (11); similarly, the anode suspension solution (17) continuously or intermittently flows within the gap space between the anode current collector (12) within the anode reaction chamber (15) and the separator (13), and electrons transfer between the anode suspension solution (17) and the anode current collector (12); and lithium ions are exchanged and transmitted between the cathode suspension solution (16) within the cathode reaction chamber and the anode suspension solution (17) within the anode reaction chamber through the separator (13).

The problem existing in the above design is that, taking into account the fluidity of electrode suspension solution, the larger the gap distance between the current collector and the separator is (i.e., the larger the space of the reaction chamber is), the more easily the viscous electrode suspension solution flows, otherwise too small gap distance will make the electrode suspension solution flow difficulty; while taking into account the polarization resistance, the smaller the gap distance between the current collector and the separator is (i.e., the smaller the space of the reaction chamber is), the smaller the current collecting internal resistance is, otherwise too large gap distance will increase the conductive distance of electrons and ions in the electrode suspension solution, thereby increasing the internal resistance of the battery and lowering the charge-discharge conversion efficiency. Therefore, the above interacting factors restrict the design flexibility for dimension of the reaction chamber, and affect the performance of the lithium ion flow battery.

SUMMARY OF THE INVENTION

To solve the above conflict problem, the present invention provides a novel lithium ion flow battery with altered structure and location of the current collector, wherein cathode and anode current collectors are located at both sides of an separator respectively and in close contact with the separator to constitute sandwich composite structure layers, the gap between two adjacent sandwich composite structure layers constituting a battery reaction chamber. Such design of structure allows dimension of the battery reaction chamber to be flexibly adjusted according to the viscosity of the electrode suspension solution without increasing the polarization resistance of the battery. The invention solves the current conflict restriction between the dimension of the reaction chamber and the polarization resistance of the lithium ion flow battery.

The object of the present invention is achieved by providing a novel lithium ion flow battery comprising cathode current collectors, anode current collectors, a cathode reaction chamber, an anode reaction chamber, a separator, a cathode suspension solution and an anode suspension solution, wherein the cathode suspension solution continuously or intermittently flows within the cathode reaction chamber, the anode suspension solution continuously or intermittently flows within the anode reaction chamber, the current collectors constituting the cathode reaction chamber are the cathode current collectors, and the current collectors constituting the anode reaction chamber are the anode current collectors; and wherein the cathode and anode current collectors are located at both sides of the separator respectively and in close contact therewith to constitute sandwich composite structure layers of the cathode current collector, the separator and the anode current collector; and several sandwich composite structure layers are arranged in an order that current collectors with the same polarity are oppositely arranged, wherein the distance between the two adjacent cathode current collectors is 1 to 10 mm, a gap formed therebetween constituting the cathode reaction chamber, in which the cathode suspension solution continuously or intermittently flows; and the distance between the two adjacent anode current collectors is 1 to 10 mm, a gap formed therebetween constituting the anode reaction chamber, in which the anode suspension solution continuously or intermittently flows.

According to the present invention, the two adjacent sandwich composite structure layers are spaced therebetween by 1 to 10 mm, preferably 2 to 5 mm.

Compared with existing lithium ion flow battery, the electrode suspension solution of the novel lithium ion flow battery flows in the gap between current collectors with the same polarity, rather than in the gap between the separator and the current collector, thus the polarization resistance of the battery is almost irrelative with the size of the reaction chamber. The dimension of the reaction chamber can be designed flexibly according to the viscosity of the electrode suspension solution without affecting the performance of the internal resistance of the battery. Therefore, the invention can solve the current conflict restriction between the dimension of the reaction chamber and the polarization resistance in the existing lithium ion flow battery.

According to the present invention, the cathode and/or anode current collectors are electron-conductive layers with a structure of through holes, having a thickness of 0.01 to 1,000 μm and having porosity of 30% to 99% and a pore diameter in a range from 10 nm to 2 mm.

The porous electron-conductive layer is a porous mixture composed of conductive filler and adhesive, wherein the mass fraction of the conductive filler is 30% to 95%; the conductive filler is alloy conductive particles such as titanium powder, copper powder, aluminum powder, silver powder, lithium-enriched silicon powder and lithium-enriched tin powder and so on, or alternatively the conductive filler is one or more of carbon black, carbon nanotube, carbon fiber and graphene; the adhesive is one or more of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene-butadiene rubber, carboxymethylcellulose sodium, modified polyolefin, polyacetylene, polypyrrole and derivatives thereof, polythiophene and derivatives thereof, polyaniline and derivatives thereof, poly(p-phenylenevinylene) and derivatives thereof, polyparaphenylene and derivatives thereof, and polyfluorene and derivatives thereof.

Or alternatively the porous electron-conductive layer is a metal conductive layer having a structure of through holes. The metal conductive layer is formed of woven metal wires or metal wires surface-coated with a conductive carbon material coating, the meshes thereof being in quadrate, rhombus or rectangular shape; or the metal conductive layer is a porous foam metal layer having a structure of through is or holes; or the metal conductive layer is made of porous metal plate or foil formed through mechanical punching or chemical corrosion, the meshes thereof being in circular, oval, semicircular, quadrate, hexagonal, triangular, rhombus, trapezoidal or irregular polygonal shape. The porous metal plate or foil is made from aluminum, aluminum alloy, stainless steel, silver, tin, nickel or titanium, preferably aluminum, when used for the cathode current collector; and the porous metal plate or foil is made from copper, stainless steel, nickel, titanium, silver, tin, tin-plated copper, nickel-plated copper or silver-plated copper, preferably nickel-plated copper, when used for the anode current collector. Further, the porous metal plate or foil is surface-coated with a conductive carbon material coating.

Or alternatively the porous electron-conductive layer is one or more of conductive cloth in terylene porous fiber, conductive cloth in carbon fiber, and conductive cloth in a mixture of metal wire and organic fiber; or alternatively the porous electron-conductive layer is made from a porous organic material surface-coated with conductive carbon material coating or plated with a metal film, the porous organic material including natural cotton and linen, terylene, aramid, nylon, polypropylene, polyethylene, polytetrafluoroethylene and other organics with good performance in electrolyte resistance.

Or alternatively the cathode and/or anode current collectors are polymer electrolyte layer added with the above conductive filler, wherein the mass fraction of the conductive filler is 10% to 90%; and the polymer electrolyte layer is composite gel polymer electrolyte compounded by three parts of polymer matrix, liquid organic plasticizer and lithium salt.

Or alternatively the cathode and/or anode current collectors are the current collecting layers compositely composed of two or more of the above current collectors.

The separator is composed of electronic insulating materials and has a thickness of 0.01 to 1 mm.

The separator is located between the cathode and anode current collectors and in close contact therewith to constitute sandwich composite structure layers. The separator is used to prevent short circuit occurred within the battery caused by direct contact between the cathode and anode current collectors located at both sides of the separator, and meanwhile, the separator admits lithium ions to pass through. The separator is polyethylene, polypropylene, polyvinylidene fluoride or other electron-nonconductive porous polymer materials; or alternatively the separator is glass fiber non-woven fabrics, synthetic fiber non-woven fabrics, ceramic fiber paper or other electron-nonconductive porous composite materials of non-metallic inorganic materials and organic polymers; or alternatively the separator is made from composite gel polymer electrolytes compounded by three parts of electron-nonconductive polymer matrix, liquid organic plasticizer and lithium salt.

The number of the separator between the cathode and anode current collectors may be one or more.

The current collector may be combined with the separator by processes such as vacuum evaporation, electroplating, chemical plating, tape casting, spin coating, spray coating, heat pressing, screen printing, ink-jet printing, bonding or mechanical pressing, allowing the current collector and the separator to form closely attached sandwich composite structure layers.

The cathode suspension solution is a mixture of particles of cathode active materials, a conductive additive and an electrolyte, wherein the cathode active materials are one of lithium containing lithium ferrous phosphate, lithium manganese phosphate, doped lithium manganese oxide, lithium cobalt oxide, lithium nickel manganese oxide, lithium nickel cobalt oxide, lithium nickel manganese cobalt oxide, lithium nickel manganese iron oxide and other lithium containing metal oxide, or a mixture thereof; and the conductive additive is one of carbon black, carbon fiber, Ketjen black, graphene and metal particles, or a mixture thereof.

The anode suspension solution is a mixture of particles of anode active materials, a conductive additive and an electrolyte, wherein the anode active materials are one of aluminum base alloy, silicon base alloy, tin base alloy, lithium titanium oxide and carbon materials that can be reversely embedded with lithium, or a mixture thereof; and the conductive additive is one of carbon black, carbon fiber, Ketjen black, graphene and metal particles, or a mixture thereof.

Or further, the reaction chamber is provided with a flow deflector directly contacting with the current collectors with the same polarity at both sides of the reaction chamber to divide the reaction chamber into several parallel flow passages. The flow deflector has effects of both stream guiding for the electrode suspension solution flowing within the reaction chamber, and supporting the sandwich composite structure layers located at both sides of the battery reaction chamber. The flow deflector has a section shape within the reaction chamber including one or more of rectangular wave, sine wave, square wave, triangular wave, trapezoidal wave, saw tooth wave, impulse wave or other irregular waves in a convex-concave form. The flow deflector can be made from nonconductive insulating plastic plate, and can also be made from conductive graphite plate, conductive metal plate or plastic plate plated with a metallic film. In the case that the flow deflector is electron-conductive, in addition to the above functions of stream guiding and supporting, it can further be provided with metal wires at both ends thereof to form electrode tabs, thereby transporting and exporting electrons collected by the current collectors through the flow deflector, and thus the flow deflector herein can further have an effect of guiding stream of electrons.

The operational principle of the lithium ion flow battery of the present invention is presented as follows:

The cathode suspension solution of the lithium ion flow battery of the present invention is located within the cathode reaction chamber, and the anode suspension solution is located within the anode reaction chamber, the cathode and anode reaction chambers being separated by the sandwich composite structure layers, the current collectors with the same polarity of the adjacent sandwich composite structure layers being oppositely arranged and spaced therebetween by 1 to 10 mm, preferably by 2 to 5 mm. When the battery is discharged, lithium ions are deintercalated from particles of anode active materials in the anode suspension solution, enter electrolyte, then pass through the sandwich composite structure layers to migrate towards the cathode reaction region and are embedded into particles of cathode active materials in the cathode suspension solution. In the meanwhile, electrons inside the particles of the anode active materials in the anode suspension solution are transported through the conductive additive within the anode suspension solution, enter the anode current collector of the sandwich composite structure layers, flow into an external loop of the battery via anode tabs of the anode current collector, then flow into the cathode current collector of the sandwich composite structure layers via cathode tabs after work done by the external circuits, and enter the inside of the particles of the cathode active materials in the cathode suspension solution through transport by the conductive additive in the cathode suspension solution, thereby completing an electrochemical process of discharge. The charge process of the battery is on the contrary.

In above discharge and charge processes, the cathode suspension solution in the cathode reaction chamber is in a continuous or intermittent flow state, and form a network-shaped electrical conducting passage through contacts between the particles of cathode active materials and those of the conductive additive, and contact between the particles of the conductive additive and surface of the cathode current collector. The anode suspension solution in the anode reaction chamber acts likewise. When the battery is working, the cathode and anode suspension solutions transmit lithium ions through the separator in the middle of the sandwich composite structure layers, and collect and transmit electrons through the cathode and anode current collectors located at both sides of the sandwich composite structure layers.

Therefore, it is particularly indicated that, the current collector must be an electron-conductive layer having through holes, or alternatively, the current collector is a polymer electrolyte layer added with electron-conductive materials, such that lithium ions can migrate between the cathode and anode reaction chambers through the electrolyte or polymer electrolyte in the current collectors; and meanwhile, electrons can be intercommunicated with the external loop of the battery through current collection of the current collectors and transmit between the cathode and anode suspension solutions, when the battery is working.

The present invention has advantages in the following aspects:

1) the design of the sandwich composite structure layers composed of a cathode current collector, a separator and an anode current collector allows the dimension of the battery reaction chamber to be flexibly designed according to the viscosity of the electrode suspension solution without increasing the polarization resistance of the battery, thereby solving the current conflict restriction existing between the dimension of the reaction chamber and the polarization resistance of the lithium ion flow battery;

2) the design of the sandwich composite structure layers allows the electrode suspension solution to achieve excellent effects of current collection and electrical conduction in the presence of less conductive additive. Thus, compared with existing lithium ion flow battery, the novel lithium ion flow battery lowers requirement on the electronic conductivity of the electrode suspension solutions, i.e. the contents of the conductive additives in the electrode suspensions solution can be lowered, and augments the energy density and fluidity of the electrode suspension solutions;

3) the dimension of the battery reaction chamber can be enlarged randomly, even when the electrode suspension solution has a high viscosity, to decrease flow resistance of the viscous electrode suspension solutions in the battery reaction chambers, thereby decreasing drive loss of electrode suspension solutions and improving energy efficiency of battery.

BRIEF DESCRIPTION OF THE DRAWINGS

To illustrate more clearly the examples of the present invention and the technical solutions in the prior art, figures for reference in the examples are briefly introduced as follows. It is obvious that the figures described as follows correspond to merely some examples of present invention, based upon which one of ordinary skilled in the art may further achieve other figures without any creative work.

DETAILED DESCRIPTION OF THE EMBODIMENTS

The technical solutions of examples of the present invention are now illustrated clearly and completely by reference to the figures for examples of the present invention. It is obvious that the illustrated examples are merely a part of, rather than all examples of the invention. Based on the examples of the present invention, all other examples achieved by one of ordinary skilled in the art without further creative work should fall into the protection scope of the present invention.

The present invention is now further illustrated through the following examples by reference to figures.

Figure 1:
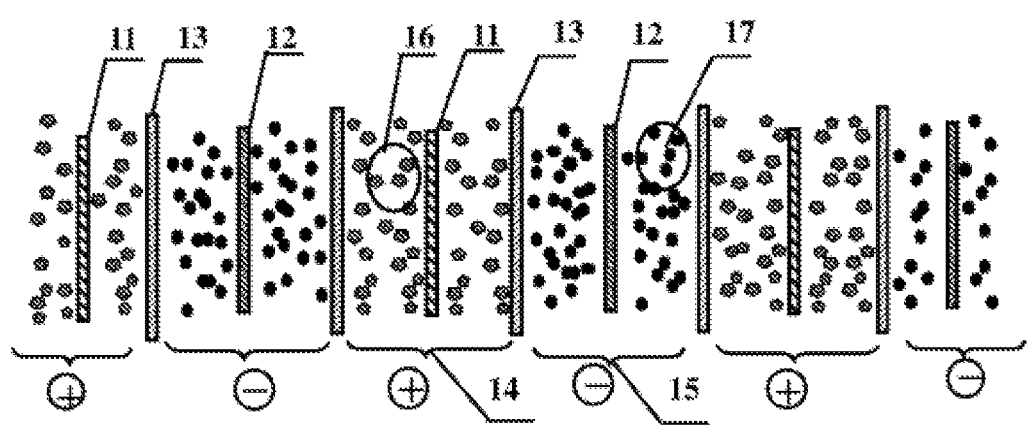
FIG. 1 is a schematic structural view of the existing lithium ion flow battery.

As shown in FIG. 1, an existing lithium ion flow battery comprises a cathode current collector 11, an anode current collector 12, a separator 13, a cathode suspension solution 16 and an anode suspension solution 17. A space between adjacent separators 13 forms a cathode reaction chamber 14 and an anode reaction chamber 15 in sequence, the cathode current collector 11 being located within the cathode reaction chamber 14, the anode current collector 12 being located within the anode reaction chamber 15. When the battery is working, lithium ions are exchanged and transmitted through the separator 13 between the cathode suspension solution 16 within the cathode reaction chamber 14 and the anode suspension solution 17 within the anode reaction chamber 15. Therefore, in such structure of the battery reactor, the smaller the distance between the current collector and the separator, the easier the ions and electrons will be transmitted, but the reduction of the distance between the current collector and the separator will increase flow resistance of the suspension solution, thereby being detrimental to the flow of the electrode suspension solution, thus leading to a conflict.

Figure 2:
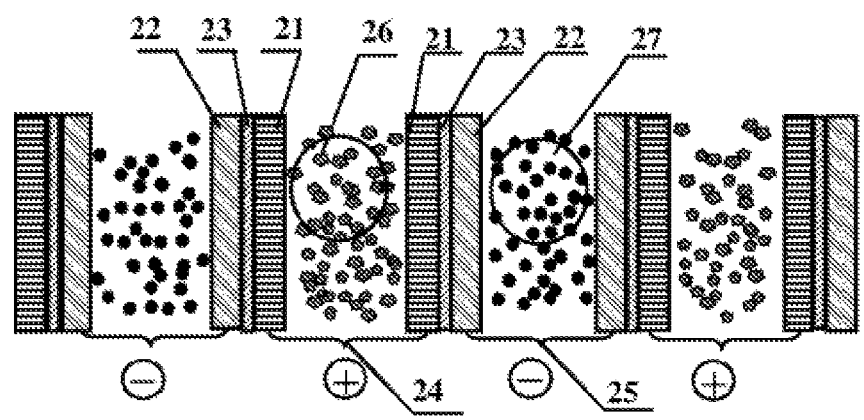
FIG. 2 is a schematic structural view of the lithium ion flow battery of the present invention.

As shown in FIG. 2, the lithium ion flow battery of the present invention has a modified position and structure of the current collector such that the dimension of the battery reaction chamber can be flexibly designed, thereby solving the severe conflict in aspect of structural design of the existing lithium ion flow battery reactor. The lithium ion flow battery of the invention comprises a cathode current collector 21, an anode current collector 22, a separator 23 located between the cathode and anode current collectors, a cathode suspension solution 26 and an anode suspension solution 27. The cathode current collector 21 and the anode current collector 22 are located respectively at both sides of the separator 23, and in close contact therewith to constitute sandwich composite structure layers. Accordingly, a space between adjacent cathode current collectors 21 constitutes a cathode reaction chamber 24, in which the cathode suspension solution 26 continuously or intermittently flows, and a space between adjacent anode current collectors 22 constitutes an anode reaction chamber 25, in which the anode suspension solution 27 continuously or intermittently flows. Such structure allows the size of the battery reaction chamber almost irrelative with the polarization resistance of the battery, upon which the current collection effect of the current collectors will not be affected even if the distance between adjacent sandwich composite structure layers are enlarged.

Figure 3:
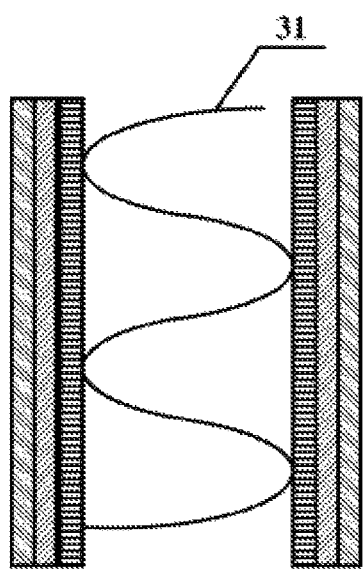
FIG. 3 is a schematic structural view of the battery reaction chamber provided with a flow deflector of the present invention.

As shown in FIG. 3, provided is a schematic structural view of the battery reaction chamber of the invention, in which a flow deflector is disposed. A flow deflector 31 directly contacts with the current collectors with the same polarity at both sides of the reaction chamber to divide the latter into several spaces that plays a role in guiding the electrode suspension solution flowing within the reaction chamber, and simultaneously supporting the sandwich composite structure layers located at both sides of the battery reaction chamber. The flow deflector 31 has a section shape within the reaction chamber including one or more of rectangular wave, sine wave, square wave, triangular wave, trapezoidal wave, saw tooth wave, impulse wave or other irregular waves in a convex-concave form. The flow deflector 31 can be made from non-conductive insulating plastic plate, or can also be made from conductive graphite plate, conductive metal plate or plastic plate plated with a metallic film. In the case that the flow deflector is electron-conductive, in addition to the above functions of stream guiding and supporting, it can further be provided with metal wires at both ends thereof to form electrode tabs, thereby transporting and exporting electrons collected by the current collectors through the flow deflector, and thus the flow deflector herein can further have an effect of guiding stream of electrons.

Example 1

This example provides sandwich composite structure layers of the lithium ion flow battery.

The structure of reaction chamber of the lithium ion flow battery is shown in FIG. 2. In the example, a PP/PE/PP porous composite film is used as an separator 23. The separator 23 is spray-coated at both surface thereof with a cathode current collector 21 and an anode current collector 22, respectively. The cathode current collector 21 is a conductive coating formed of a mixture of carbon nanotube with a mass percent of 90% and polyvinylidene fluoride, and has a thickness of 20 μm. The anode current collector 22 is a conductive coating formed of a mixture of carbon fiber with content of 90% and polyvinylidene fluoride, and has a thickness of 20 μm.

Further, two adjacent cathode current collectors 21 in which contained a cathode suspension solution 26 form a cathode reaction chamber 24. In the example, the distance between the two adjacent cathode current collectors 21 forming the cathode reaction chamber 24 is 2 mm, that is, the width of the cathode reaction chamber is 2 mm. Correspondingly, two adjacent anode current collectors 22 in which contained an anode suspension solution 27 form an anode reaction chamber 25. In the example, the distance between the two adjacent anode current collectors 22 forming the anode reaction chamber 25 is 2 mm, that is, the width of the anode reaction chamber is 2 mm.

Aluminum foil led out from both ends of the cathode current collector serves as cathode terminals, and the respective cathode terminals are connected by wires and led out to serve as cathode tab. Copper foil led out from both ends of the anode current collector serves as anode terminals, and the respective anode terminals are connected by wires and led out to serve as anode tab.

Example 2

This example provides another sandwich composite structure layers of the lithium ion flow battery, in which the lithium ion flow battery has a structure similar to that in example 1, by reference to the schematic structural view of FIG. 2.

In the example, a conductive polymer electrolyte film, which is a composite gel polymer electrolytes compounded by three parts of polymer matrix, liquid organic plasticizer and lithium salt, is selected as a separator. Porous carbon fiber conductive cloth is selected as both the cathode current collector having a thickness of 900 μm and the anode current collector having the same thickness of 900 μm. Sandwich composite structure layers are constituted by bonding the cathode current collector, the separator and the anode current collector.

In the example, the width of the cathode reaction chamber 24 is 5 mm and the width of the anode reaction chamber 25 is 5 mm.

Example 3

This example provides another sandwich composite structure layers of lithium ion flow battery which has a structure similar to examples 1 and 2, by reference to the schematic structural view of FIG. 2.

In the example, a bilayer-structured PE porous film is selected as a separator.

The cathode current collector is a composite structure of porous aluminum foil and porous conductive coatings, and has a thickness of 0.08 mm, wherein the aluminum foil has a thickness of 0.05 mm and the meshes of the aluminum foil are in quadrate shape with a pore diameter of 0.5 mm and through-hole porosity of 60%. The anode current collector is a composite structure of porous copper foil and porous conductive coatings, and has a thickness of 0.08 mm, wherein the copper foil has a thickness of 0.05 mm and the meshes of the copper foil are in circular shape with a pore diameter of 0.5 mm and through-hole porosity of 60%.

Further, the porous conductive coating is a mixture of carbon powder with content of 70% and polyvinylidene fluoride. The mixture of carbon powder and polyvinylidene fluoride form porous conductive coatings having a thickness of 0.02 mm on the surface of the porous aluminum foil or porous copper foil by spray coating.

The sandwich composite structure layers is formed by the above cathode current collector, the separator and the anode current collector through mechanical pressing.

In the example, the width of the forming cathode reaction chamber 24 is 10 mm and the width of the anode reaction chamber 25 is 10 mm.

It should be indicated that, the above examples are merely preferable examples of the present invention, without making any limitation to the technical solution of the present invention. In the examples of the present invention, the component materials of the cathode and anode current collectors can be any known or unknown appropriate materials, and the thicknesses thereof can also be any appropriate thicknesses. The widths of the cathode and anode reaction chambers can be any other appropriate widths, to all of which the present invention does not make any limitation.

Furthermore, the thicknesses of the cathode and anode current collectors may be the same with or different from each other, and the widths of the cathode and anode reaction chambers may be the same with or different from each other, to all of which the present invention does not make any limitation.

Lastly it should be noted that, disclosure of the implementing embodiments of the present invention is to further facilitate the understanding of the present invention, but it may be understood for those skilled in the art that, without departing from the spirit and scope of the invention and claims attached thereafter, a variety of substitutes and modifications can be made. Therefore, the present invention should not be restricted to the contents disclosed in the examples, and the protection scope as claimed in the present invention should be subject to the scope defined by the claims.

What is claimed is:

1. A novel lithium ion flow battery, comprising cathode current collectors, an anode current collectors, a cathode reaction chamber, an anode reaction chamber, a separator, a cathode suspension solution and an anode suspension solution, wherein the cathode suspension solution continuously or intermittently flows within the cathode reaction chamber, the anode suspension solution continuously or intermittently flows within the anode reaction chamber, the current collectors constituting the cathode reaction chamber are the cathode current collectors, and the current collectors constituting the anode reaction chamber are the anode current collectors; characterized in that: the cathode and anode current collectors are located at both sides of the separator respectively and in close contact with the separator to constitute sandwich composite structure layers of the cathode current collector, the separator and the anode current collector; and in that several sandwich composite structure layers are arranged in an order that current collectors with the same polarity are oppositely arranged, wherein the distance between two adjacent cathode current collectors is 1 to 10 mm, a gap formed therebetween constituting the cathode reaction chamber, and the distance between two adjacent anode current collectors is 1 to 10 mm, a gap formed therebetween constituting the anode reaction chamber.

2. The lithium ion flow battery according to claim 1, characterized in that: the distance between two adjacent cathode current collectors, forming the cathode reaction chamber, is preferably 2 to 5 mm, and the distance between two adjacent anode current collectors, forming the anode reaction chamber, is preferably 2 to 5 mm.

3. The lithium ion flow battery according to claim 1, characterized in that: the cathode and/or anode current collectors are porous electron-conductive layers with a structure of through holes, having a thickness of 0.01 to 1,000 μm and having porosity of 30% to 99% and a pore diameter in a range from 10 nm to 2 mm;

wherein, the porous electron-conductive layer is a porous mixture composed of conductive filler and adhesive, wherein the mass fraction of the conductive filler is 30% to 95%; the conductive filler is alloy conductive particles such as titanium powder, copper powder, aluminum powder, silver powder, or lithium-enriched silicon powder and lithium-enriched tin powder, or alternatively the conductive filler is one or more of carbon black, carbon nanotube, carbon fiber and graphene; the adhesive is one or more of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene-butadiene rubber, carboxymethylcellulose sodium, modified polyolefin, polyacetylene, polypyrrole and derivatives thereof, polythiophene and derivatives thereof, polyaniline and derivatives thereof, poly (p-phenylenevinylene) and derivatives thereof, polyparaphenylene and derivatives thereof, and polyfluorene and derivatives thereof;

or alternatively the porous electron-conductive layer is a metal conductive layer having a structure of through holes, which is formed of woven metal wires or metal wires surface-attached with a conductive carbon material coating, meshes thereof being in quadrate, rhombus or rectangular shape; or the metal conductive layer is a porous foam metal layer having a structure of through holes; or the metal conductive layer is made of porous metal plate or metal foil through mechanical punching or chemical corrosion, the meshes thereof being in circular, oval, semicircular, quadrate, hexagonal, triangular, rhombus, trapezoidal or irregular polygonal shape, wherein the porous metal plate or metal foil is made from aluminum, aluminum alloy, stainless steel, silver, tin, nickel or titanium, preferably aluminum when used for the cathode current collector; the porous metal plate or metal foil is made from copper, stainless steel, nickel, titanium, silver, tin, tin-plated copper, nickel-plated copper or silver-plated copper, preferably nickel-plated copper when used for the anode current collector; and further, the metal plate or metal foil surface-coated with a conductive carbon material coating;

or alternatively the porous electron-conductive layer is one or more of conductive cloth in terylene porous fiber, conductive cloth in carbon fiber, and conductive cloth in a mixture of metal wire and organic fiber; or alternatively the porous electron-conductive layer is made from a porous organic material surface-coated with a conductive carbon material coating or plated with a metal film, the porous organic material including natural cotton and linen, terylene, aramid, nylon, polypropylene, polyethylene, polytetrafluoroethylene and other organics resistant to electrolyte.

4. The lithium ion flow battery according to claim 1, characterized in that: the cathode and/or anode current collectors are polymer electrolyte layer added with a conductive filler, wherein the mass fraction of the conductive filler is 10% to 90%; and the polymer electrolyte layer is composite gel polymer electrolyte compounded by three parts of polymer matrix, liquid organic plasticizer and lithium salt, wherein the conductive filler is alloy conductive particles such as titanium powder, copper powder, aluminum powder, silver powder, or lithium-enriched silicon powder and lithium-enriched tin powder, or alternatively the conductive filler is one or more of carbon black, carbon nanotube, carbon fiber and graphene.

5. The lithium ion flow battery according to claim 1, characterized in that: the cathode and/or anode current collectors are the current collecting layers compositely composed of two or more selected from the group consisting of the following current collectors:

the cathode and/or anode current collectors are porous electron-conductive layers with a structure of through holes, having a thickness of 0.01 to 1,000 μm and having porosity of 30% to 99% and a pore diameter in a range from 10 nm to 2 mm; or the cathode and/or anode current collectors are polymer electrolyte layer added with a conductive filler, wherein the mass fraction of the conductive filler is 10% to 90%; and the polymer electrolyte layer is composite gel polymer electrolyte compounded by three parts of polymer matrix, liquid organic plasticizer and lithium salt; wherein, the conductive filler is alloy conductive particles such as titanium powder, copper powder, aluminum powder, silver powder, or lithium-enriched silicon powder and lithium-enriched tin powder, or alternatively the conductive filler is one or more of carbon black, carbon nanotube, carbon fiber and graphene, wherein, the porous electron-conductive layer is a porous mixture composed of the conductive filler and adhesive, wherein the mass fraction of the conductive filler is 30% to 95%; the adhesive is one or more of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene-butadiene rubber, carboxymethylcellulose sodium, modified polyolefin, polyacetylene, polypyrrole and derivatives thereof, polythiophene and derivatives thereof, polyaniline and derivatives thereof, poly (p-phenylenevinylene) and derivatives thereof, polyparaphenylene and derivatives thereof, and polyfluorene and derivatives thereof;

or alternatively the porous electron-conductive layer is a metal conductive layer having a structure of through holes, which is formed of woven metal wires or metal wires surface-attached with a conductive carbon material coating, meshes thereof being in quadrate, rhombus or rectangular shape; or the metal conductive layer is a porous foam metal layer having a structure of through holes; or the metal conductive layer is made of porous metal plate or metal foil through mechanical punching or chemical corrosion, the meshes thereof being in circular, oval, semicircular, quadrate, hexagonal, triangular, rhombus, trapezoidal or irregular polygonal shape, wherein the porous metal plate or metal foil is made from aluminum, aluminum alloy, stainless steel, silver, tin, nickel or titanium, preferably aluminum when used for the cathode current collector; the porous metal plate or metal foil is made from copper, stainless steel, nickel, titanium, silver, tin, tin-plated copper, nickel-plated copper or silver-plated copper, preferably nickel-plated copper when used for the anode current collector; and further, the metal plate or metal foil surface-coated with a conductive carbon material coating;

or alternatively the porous electron-conductive layer is one or more of conductive cloth in terylene porous fiber, conductive cloth in carbon fiber, and conductive cloth in a mixture of metal wire and organic fiber; or alternatively the porous electron-conductive layer is made from a porous organic material surface-coated with a conductive carbon material coating or plated with a metal film, the porous organic material including natural cotton and linen, terylene, aramid, nylon, polypropylene, polyethylene, polytetrafluoroethylene and other organics resistant to electrolyte.

6. The lithium ion flow battery according to claim 1, characterized in that: the separator is polyethylene, polypropylene, polyvinylidene fluoride or other electron-nonconductive porous polymer materials; or alternatively the separator is glass fiber non-woven fabrics, synthetic fiber non-woven fabrics, ceramic fiber paper or other electron-nonconductive porous composite materials of inorganic non-metallic materials and organic polymers; or alternatively the material of the separator adopts composite gel polymer electrolyte compounded by three parts of electron-nonconductive polymer matrix, liquid organic plasticizer and lithium salt.

7. The lithium ion flow battery according to claim 1, characterized in that: the cathode current collector or anode current collector is combined with the separator by one or more of processes of vacuum evaporation, electroplating, chemical plating, tape casting, spin coating, spray coating, heat pressing, screen printing, ink-jet printing, bonding or mechanical pressing, allowing the cathode current collector, the separator and the anode current collector to form closely attached sandwich composite structure layers.

8. The lithium ion flow battery according to claim 1, characterized in that: the cathode suspension solution is a mixture of particles of cathode active materials, a conductive additive and an electrolyte, wherein the cathode active materials are one of lithium containing lithium ferrous phosphate, lithium manganese phosphate, doped lithium manganese oxide, lithium cobalt oxide, lithium nickel manganese oxide, lithium nickel cobalt oxide, lithium nickel manganese cobalt oxide, lithium nickel manganese iron oxide and other lithium containing metal oxide, or a mixture thereof; and the conductive additive is one of carbon black, carbon fiber, Ketjen black, graphene and metal particles, or a mixture thereof.

9. The lithium ion flow battery according to claim 1, characterized in that: the anode suspension solution is a mixture of particles of anode active materials, a conductive additive and an electrolyte, wherein the anode active materials are one of aluminum base alloy, silicon base alloy, tin base alloy, lithium titanium oxide and carbon materials that can be reversely embedded with lithium, or a mixture thereof; and the conductive additive is one of carbon black, carbon fiber, Ketjen black, graphene and metal particles, or a mixture thereof.

10. The lithium ion flow battery according to claim 1, characterized in that: the reaction chamber is further provided with a flow deflector directly contacting with the current collectors with the same polarity at both sides of the reaction chamber to divide the reaction chamber into several parallel flow passages; the flow deflector having a section shape within the reaction chamber including one or more of rectangular wave, sine wave, square wave, triangular wave, trapezoidal wave, saw tooth wave, impulse wave or other irregular waves in a convex-concave form; the flow deflector being made from one of insulating plastic plate, conductive graphite plate, conductive metal plate or plastic plate plated with a metallic film.

\* \* \* \* \*